United States Patent [19]
Latypov et al.

[11] Patent Number: 6,005,548
[45] Date of Patent: Dec. 21, 1999

[54] METHOD FOR TRACKING AND DISPLAYING USER'S SPATIAL POSITION AND ORIENTATION, A METHOD FOR REPRESENTING VIRTUAL REALITY FOR A USER, AND SYSTEMS OF EMBODIMENT OF SUCH METHODS

[76] Inventors: Nurakhmed Nurislamovich Latypov, 5 Voikovsky proezd,d.10,kv.31; Nurulla Nurislamovich Latypov, Mozhaiskoe shosse, d.30, kv.14, both of Moscow, U.S.S.R.

[21] Appl. No.: 08/910,998

[22] Filed: Aug. 14, 1997

[51] Int. Cl.[6] .................................................. G09G 5/08
[52] U.S. Cl. ..................... 345/156; 345/419; 345/420; 345/473
[58] Field of Search ..................................... 345/156, 355, 345/419, 420, 473, 976, 331, 332; 463/36

[56] References Cited

U.S. PATENT DOCUMENTS

| | | | |
|---|---|---|---|
| 3,792,243 | 2/1974 | Appel et al. | 345/156 |
| 4,600,919 | 7/1986 | Stern | 345/473 |
| 4,988,981 | 1/1991 | Zimmerman et al. | 345/156 |
| 5,323,174 | 6/1994 | Klapman et al. | 345/156 |
| 5,490,784 | 2/1996 | Carmein | 434/55 |
| 5,616,078 | 4/1997 | Oh | 345/156 |
| 5,737,505 | 4/1998 | Shaw et al. | 345/419 |
| 5,846,134 | 12/1998 | Latypov | 463/46 |

*Primary Examiner*—Bipin H. Shalwala
*Assistant Examiner*—Vincent E. Kovalick

[57] ABSTRACT

The invention relates to methods and systems for determination of position and orientation of users in a space and display of virtual space, and can be used in interactive computer games, health-strengthening teaching devices, or trainings of the athletic and military purposes. The invention provides an improved accuracy and speed of tracking of the user's spatial position and orientation, provides convenience for and naturalness of his/her movements and representation of virtual space in conformity with user's movements in the real space. Sensors 4 for tracking angular position of segments 2 of the user's locomotor system are attached at places of articulations 3 of segments 2 and at certain segments 2 proper. At least at one of segments 2 arranged are main means 5 for determination of reference directions, which means provide determination of orientation of a given segment relative to the reference directions. Data from sensors 4, means 5 for determination of reference directions and, when necessary, from devices 8 of interaction of a user with the virtual space objects are processed for determination of the user's orientation and position as a whole on the basis of particular values of angles between segments, and orientation of a main segment whereat means for determination of reference directions, relative to the reference directions, are arranged. Obtained data are used for displaying user's movements in real time, or representation for a user of virtual space that corresponds to his/her viewing field that varies according to movements in real space.

52 Claims, 3 Drawing Sheets

METHOD FOR TRACKING AND DISPLAYING USER'S SPATIAL POSITION AND ORIENTATION, A METHOD FOR REPRESENTING VIRTUAL REALITY FOR A USER, AND SYSTEMS OF EMBODIMENT OF SUCH METHODS

FIELD OF INVENTION

The invention relates to the systems for determining user's spatial position and orientation, and be used for interactive computer games, teaching simulators, and training courses of the athletic and military purposes. The invention is suitable to be used to tone health, for learning and mastering the correct performance of motion exercises and techniques in sports games and dances by children and adults.

BACKGROUND OF THE INVENTION

Known are systems for tracking and displaying person's body positions in motion, which use mechanical means to track positions of a head and body parts—goniometers intended to measure angles of rotation of joints and determine final positions, e.g. of an arm relative to a body, or a finger tip relative to a hand.

The following can be considered as drawbacks of such systems: difficult adjustment of goniometers to human joints, particularly those having a number of freedom degrees, for example—the glenohumeral joints, due to mismatch of the goniometer rotation centres with those of joints rotation. Human joints are not ideal pivots: rotation axes shift when joints rotation angles vary. For improvement of the required accuracy, the appropriate calibrations are to be done.

Also known are magnetic systems for tracking and displaying user's spatial position and orientation (see: Burdea G., Coiffet P./Virtual reality technology, 1994, John Wiley & Sons, Inc., p.p. 17–25). Among these systems are Motion Capture Server manufactured by Polhemus company, and Flock of Birds manufactured by Ascenslon Technology Corp., that comprise a plurality of motion parameters measurement processing plates, a controller, an external synchronisation plate, a communication plate, a keyboard and a monitor, a transmitter comprising three electromagnetic coils, and a plurality of receivers, each of which receivers further includes a triad of electromagnetic minicoils that sense magnetic fields emitted by a transmitter.

Operation range of these systems is not large, the accuracy depends on the distance between a transmitter and a receiver. In a variable magnetic fields system, the presence of foreign metallic articles affects the accuracy due to induction of eddy currents. A constant magnetic fields system is less sensitive to the presence of metallic articles, but the magnetic resistance effect can introduce distortions into the magnetic fields produced by a transmitter.

Moreover, other issues that should be regarded as drawbacks of such systems are an insufficient performance speed as a result of temporal delays in establishing the analogue signal, as well as a high level of noise causing the displayed image to jitter.

Known is an ultrasonic system for tracking the user's spatial position and orientation, comprising a transmitter in the form of a set consisting of three transmitting electroacoustic converters rigidly secured on a support frame, receivers in the form of sets consisting of three microphones rigidly secured on a support frame arranged on a user, e.g. on a helmet having a display, a system for processing a registered information, and a system for displaying a synthesised image for a user (see, ibidem, p.p. 25–28). Locating a user is based on the triangulation principle, and for determining his/her position and orientation, nine measurements of a distance are required to be done. Such system requires a direct sighting line between a system transmitter and receivers. When tracking of a great number of receivers is necessary, the polling rate falls, i.e. the measurements performance speed required for displaying movement of a mobile object and its parts in real time decreases.

The above systems are classified with the systems having sensors for determining the absolute motion parameters, in which systems the absolute position and orientation of a mobile object is measured relative to fixed co-ordinates associated with a transmitter.

Also known are systems having sensors of determination of the relative motion parameters, advantages of which systems consist in simplicity and compactness. "Gloves" used in systems of immersion in virtual reality and having sensors measuring some or all finger joints rotation angles, may be referred to as examples of such systems. Such systems can additionally comprise a sensor for determining absolute three-dimensional movement and orientation (3D-sensor) and used to track movements of user's wrist. Also known is a system that employs optical DataGlove sensors of VPL company (see ibidem, p.p. 33–37) and comprises optical fibres disposed on a light elastic glove, and a 3D-sensor. Its standard configuration uses two sensors attached at the outer side of each finger to perceive bends of main joints. Optical fibres are coupled to an optoelectronic interface. A sensor is designed such that when there is no bending of joints, then the light travelling through a fibre is not weakened, and, vice versa, when there is a bending—the light quantity changes thus allowing to measure a joint rotation angle indirectly. Measurement data are recalculated as angle values using the calibration constants and appropriate approximation equations. A decreased accuracy due to accumulation of errors in the mode of the open kinematic loop, as well as an high cost, can be considered as drawbacks of such systems.

Known is a system of representation of virtual reality for a user, comprising a movable platform unit in the form of a spherical hull with six freedom degrees wherein a user is placed, means for determining position of the spherical hull, a computer installed inside said hull (see U.S. Pat. No. 5,490,784, cl. 434–55, IPC G 09 B 9/00, publ. 13.02.96). A transmitter sends data concerning the platform position to a receiver which in its turn transmits the received data on the angular position of the spherical platform having a user placed therein to a host computer outside the platform. Data on linear movements of such rotoplatform are supplied to the host computer. An on-helmet display tunes a virtual reality image according to the received data on the movements of the platform.

Complexity and an insufficiently high degree of reliability of simulation of the virtual space should be considered as the disadvantages of this known system.

Known is a system for representation for a user of a combined image of real and virtual environments, comprising means for visual display for a user of a composite image; a direction sensor for generating a signal that indicates the user's viewing field direction; a video camera for generating a series of video signals, the combination of which signals represents the user's viewing field; means for positioning a video camera such that its viewing field registers with that of a user and tracks his/her movements; image generation means responsive to the direction signal to generate synthesised signals which characterise a portion of the complete image generated by a computer; means for selecting and combining images to analyse video signals, and selecting video signals or those synthesised by a computer so that to form a composite video signal and send this signal to display means (see: U.S. Pat. No. 5,334,517, cl. 395-129, IPC G 06 F 15/20, publ. 14.10.92).

This known system does not ensure the possibility to provide for a user a virtual environment image that would correspond to changes of the user's position and orientation in the real space.

SUMMARY OF THE INVENTION

Object of this invention is to provide such method and system for tracking and displaying the spatial position and orientation of a user that will decrease the manufacture and operation cost while ensuring accuracy and high-speed performance required for a reliable display of the user's movements in real time.

Another object of this invention is to provide for a user the possibility, in the course of tracking of his/her movements, to move in space without any restrictions, in a natural manner, also during user's interaction with the virtual reality objects.

Moreover, another object of the invention is to improve accuracy and reliability of representation for user of the virtual space in complete correspondence thereof with changes in the user's position and orientation during his/her movements in the real space.

These objects are to be attained through that a method to track and display the spatial position and orientation according to this invention comprises the following steps:

a) attaching means, for determining at least one angle between segments adjacent to a respective articulation, at each main articulation of the user's locomotor system;

b) arranging, at least at one of segments of the user's locomotor system, means for determining reference directions;

c) determining orientation of at least one segment, whereat means for determining reference directions is arranged, relative to said reference directions;

d) determining angles between segments adjacent to said main articulations;

e) determining user's spatial orientation and position as a whole on the basis of obtained angles values and the orientation of said at least one segment, whereat means for determining reference directions are arranged.

For the purpose to obtain the interconnected series of data determining a temporal change of the user's spatial position and orientation in conformity with his/her real movements, the method includes iteration, at a specified periodicity, of steps (c) through (e), the obtained data on the user's spatial position and orientation being registered for further use.

Moreover, at step (e) values of linear dimensions of the user's locomotor system segments are used; the method preferably comprising steps of determining a reference segment and its positioning relative to a reference in a space to be displayed.

For the purpose to obtain and register series of data on the user's position and orientation in a space to be displayed, and to display the user's movements according to the obtained data, steps (d) through (g) are iterated at a predetermined periodicity. The user's movements being displayed in real time, or as necessary, at a subsequent instant of time.

The user's movements are preferably displayed in accordance with a required observation aspect or upon an additional amendment.

The aforementioned objects according to the invention are to be attained also through that the user's spatial position and orientation tracking and displaying system comprises:

a plurality of sensors of relative rotation angles arranged adjacently to main joints between the user's locomotor system segments or at the very said segments to produce at outputs of said sensors the signals of relative rotation angles of said segments;

means for determining reference directions arranged at least at one of segments of the user's locomotor system to produce the reference direction signal at output of said means for determining reference directions;

means for analogue-to-digital conversion of signals, said means having a first input for receiving signals of relative rotation angles sensors, a second input for receiving signals of the reference directions determination means, and an output for outputting digital data;

means for processing digital data to construct a mathematical model of the three-dimensional space and a user in such space, having an input for receiving digital data and an output for outputting data on the user's position and orientation in the simulated three-dimensional space, and means for displaying the user's spatial position and orientation, having an input for receiving data on the user's position and orientation in the simulated three-dimensional space.

The system for tracking and displaying the user's spatial position and orientation preferably comprises means for forming an image at a certain viewing angle and amending a formed image, which means is connected between the digital data processing means and the means for displaying the user's spatial position and orientation.

The aforementioned objects according to the invention are attained also through that a method for representation of the virtual space for a user comprises the following steps:

a) attaching, at each main articulation of the user's locomotor system segments, means for determining at least one angle between segments adjacent a respective articulation;

b) determining linear dimensions of the user's locomotor system segments;

c) arranging, at least at one of said segments, means for determining reference directions;

d) determining orientation of at least one segment, whereat the means for determining reference directions are arranged, relative to the reference directions;

e) determining angles between segments adjacent to said main articulations;

f) determining the user's spatial orientation and position as a whole on the basis of the obtained angles values and orientation of a segment, whereat the means for determining reference directions are arranged;

g) determining a reference segment of the user's locomotor system;

h) positioning a reference segment relative to a reference in the virtual space to be displayed;

i) determining a position and orientation of the user's head in the virtual space for determining the user's viewing field in the virtual space;

j) forming and representing for a user an area of the virtual space that corresponds to his/her viewing field.

Steps from (d) to (j) are further iterated to display changes occurred in the virtual space in real time in accordance with the user's movements and interaction with the virtual space objects. Series of data on the user's position and orientation are preferably registered for further use.

In the methods of the invention, the "North-South" direction of a magnetotelluric field sensor and a direction of a local vertical sensor, or directions formed by gyrostabilised sensors of reference directions; or "North-South" and "West-East" directions, or directions formed by an external source of reference directions are preferably used as reference directions.

Moreover, at least one pair of spatially separated sensors of absolute co-ordinates to be arranged at least at one of the segments of the user's locomotor segments can be used as means for determining reference directions.

It is also preferable that near dimensions of segments be determined on the basis of the known proportions of the human body using the user's height data; said linear dimensions can be scaled for a respective variation of the user's image dimensions relative to the displayed space.

The invention methods, for the purpose to ensure the user's interaction with the displayed virtual space objects, preferably provide for use of a manipulator, the position of which manipulator is defined by a position of the user's hand holding the same, and the precise orientation of the manipulator is determined using additional means, disposed thereon, for determining reference directions.

As the main articulation between the user's locomotor system segments the following joints are preferably selected: hip, knee, mortis, glenohumeral, elbow, hand joints, and articulations of head and shoulders, thoracic and waist portions of spine, and, additionally, foot and finger joints.

The above-mentioned objects are attained according to the invention also through that system for displaying the virtual space for a user who moves in the real space, comprises:

a plurality of sensors of relative rotation angles arranged adjacently to main articulations between the user's locomotor system segments, or at the very same said segments, to output signals of relative rotation angles of said segments;

means for determining reference directions, arranged at least at one of the user'locomotor system segments to output the reference direction signal;

means for analogue-to-digital conversion of signals, having a first input to receive signals of the relative rotation angles sensors, a second input to receive signals of the means for determining reference directions, and an output for outputting digital data;

means for processing digital data for construction of a mathematical model of the three-dimensional space and a user therein, having a first input for receiving said digital data, a second input for inputting additional data on a user and space to be displayed, and an output for outputting data on a constructed mathematical model of a user in a simulated space;

means for determining the user's viewing field, having an input connected to the digital data processing output, and an output;

means for forming signals of displaying the virtual space corresponding to the user's viewing field, having a first input connected to output of the digital data processing means, a second input connected to output of the means for determining the user's viewing field, and an output; and means for displaying, for a user, the virtual space, which means are connected to output of the means for forming the virtual space image signals corresponding to the user's viewing field.

Further, in the systems of the invention, a sensor of relative rotation angles is preferably a strain gauge or an optical-fibre sensor, and the means for determining reference directions comprises either a magnetotelluric field sensor and a local vertical sensor, or a gyrostabilised sensor of reference directions, or a sensor of reference directions artificial source signal.

Still further, the invention systems preferably comprise at least one means for the user's interaction with objects of the real and virtual space, which means are provided with additional means for determining reference directions.

Moreover, the invention systems preferably comprise means for storing converted measured data for further reproduction of spatial position and orientation of a user, as well as means for inputting additional data on a user and the three-dimensional space to be displayed for the purpose to construct mathematical models of three-dimensional space and a user therein.

BRIEF DESCRIPTION OF DRAWINGS

The invention is explained by examples of its embodiment illustrated by the accompanying drawings, wherein.

DETAILED DESCRIPTION OF THE INVENTION

Figure 1:
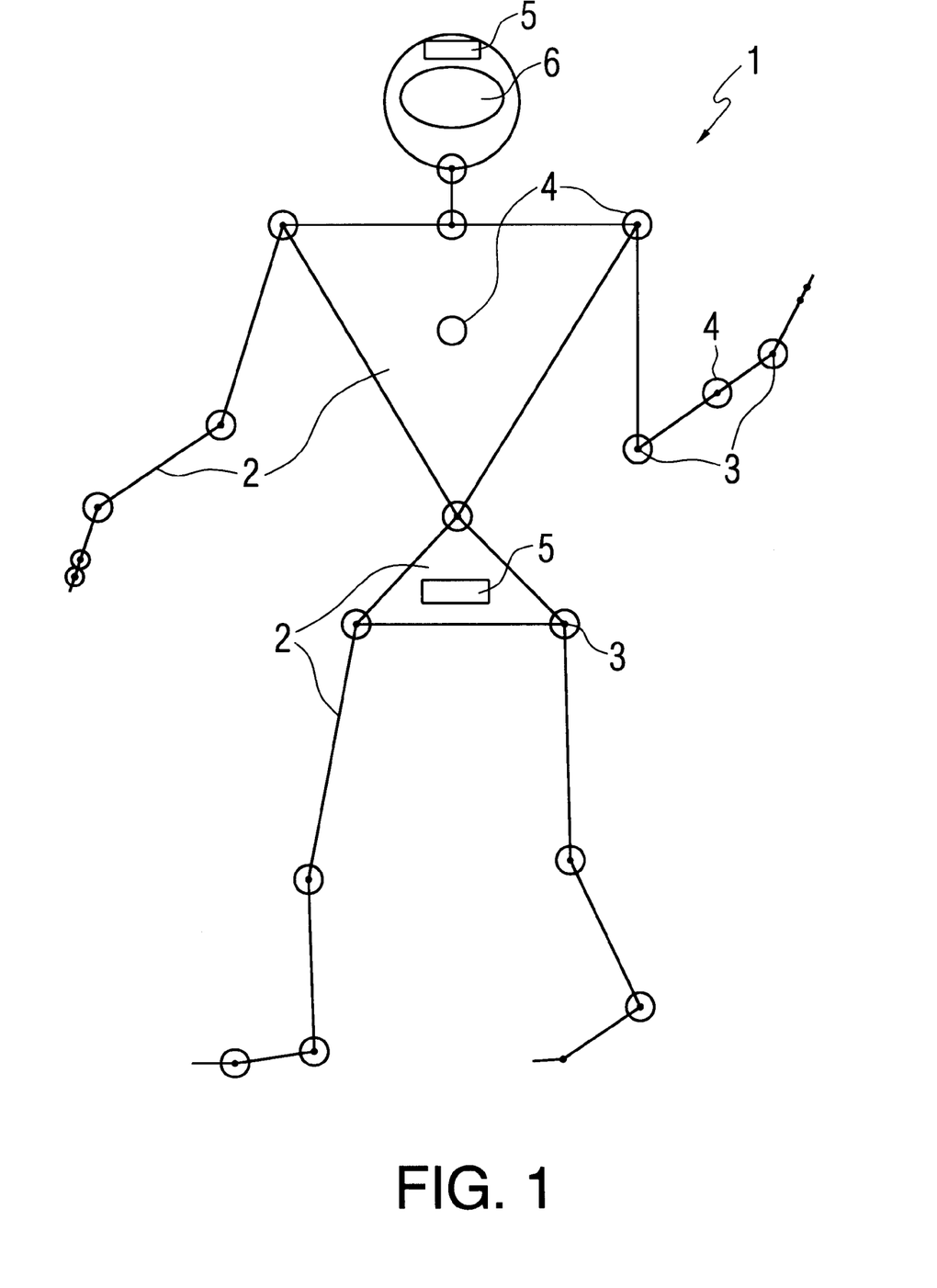
FIG. 1—schematic depiction of a user, illustrating arrangement of means for determining angles between the user's locomotor system segments, and means for determining reference directions of a system of the invention.

FIG. 1 schematically shows user 1 whose locomotor system consists of segments 2 having pivot-type articulations 3. Pivot-type articulations 3 of segments 2 simulate bones linking by joints. Pivots, like joints of a human or an animal, have different degrees of freedom. For example, linking of upper arm and shoulder, shank and thigh can be simulated by a simple pivot having single degree of freedom, and to simulate linking of shoulder in a glenohumeral joint with shield, or to simulate a hip joint, a pivot connection having more degrees of freedom is required.

Means for determining angles between segments 2 are sensors 4 intended for tracking position of segments and their parts relative to one another and arranged at places of articulations 3 of segments 2 and at segments 2 proper. They are intended for accurate tracking of the user's movements, inclusive of measuring the rotation angles of some segments relative to their axis, for example, of one end of a shoulder segment relative to its other end. Said shoulder segment consists of two spoke bones capable of a movement relative to one another thus allowing one segment end to rotate in relation to the other segment and along its axis. There is a number of segments of this kind being capable to partially rotate about its axis while not changing the angle between itself and an adjacent segment. There are, for example: head with neck that rotate relative to shoulders; body's thoracic part that rotates in relation to the pelvic portion. Sensors 4 can be optical-fibre sensors, strain gauges. In one embodiment, sensor 4 can be a sensor for measuring angular and linear shifts and consist of transmitting and receiving portions and based on variations of electromotive force induced in a receiver's loop and being variable when an angle between segments varies.

Means 5 for determining reference directions are arranged at one of segments 2 and intended to determine orientation of this segment relative to reference directions. Means 5 will be advantageously arranged at the body parts that are the most stable during such standard user's movements as walking and running. These means are recommended to be arranged at the pelvic part. When a user is immersed in the virtual reality, for a quicker and more accurate tracking of orientation of his/her head it will be expedient to use additional means for determining reference directions, which means will be disposed on head. In one of embodiments, means for determining reference directions can be arranged at adjacent segments and provide determination of their angular positions on the basis of their orientation in relation to reference directions.

Means 6 for displaying the virtual space for a user are disposed on head in front of the eyes of a user.

Figure 2:
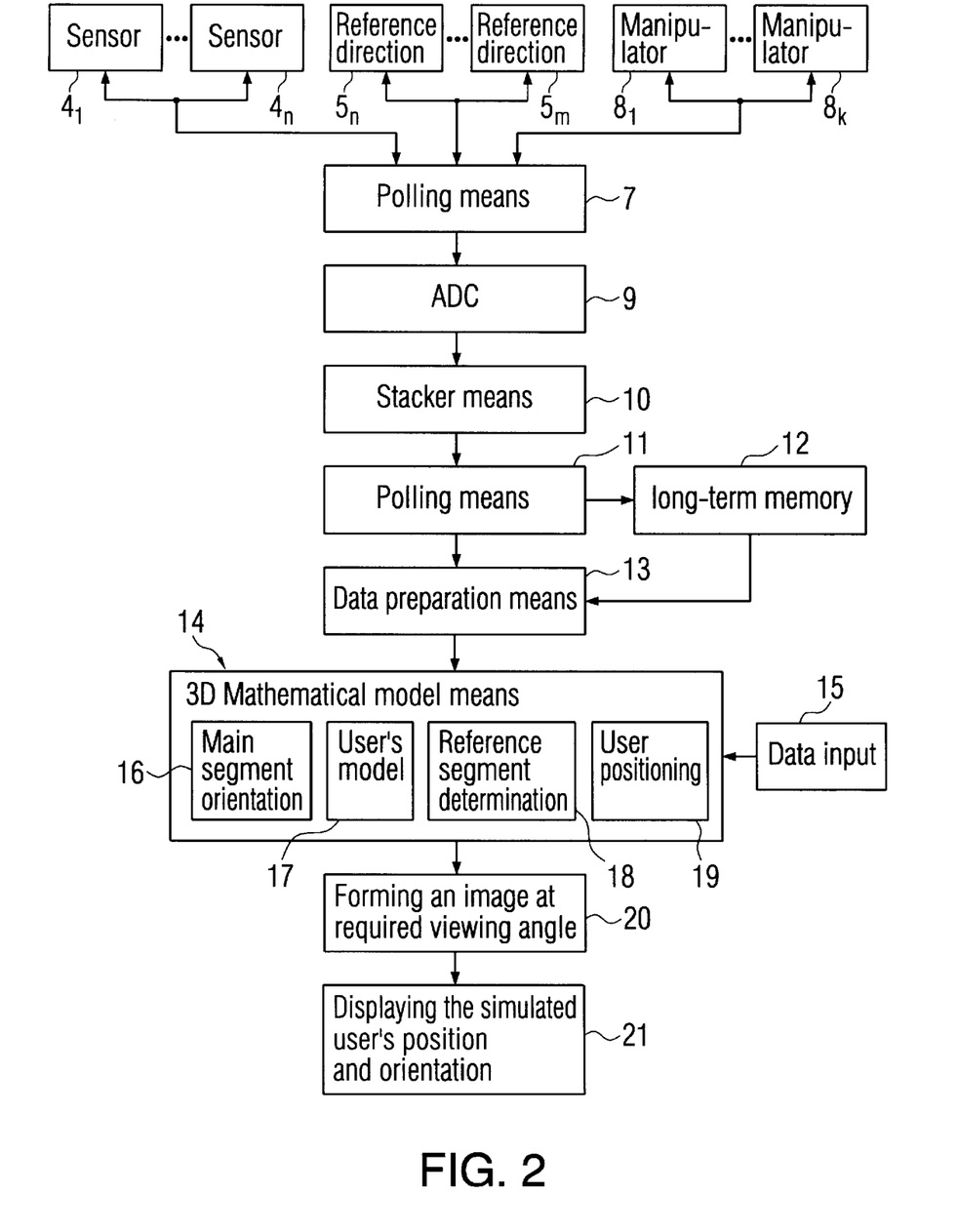
FIG. 2—generalised flowchart of a system for tracking and displaying the user's position and orientation embodied according to the invention.

As shown in FIG. 2, the system for tracking and displaying user's position and orientation in one embodiment comprises polling means 7 that includes a driving generator that determines rate of polling n sensors 4, m means 5 for determining reference directions, k additional means 8 for interaction with objects of the virtual space (manipulators, joysticks, weapon simulators, etc.). Outputs of polling means 7 are connected to analogue-to-digital converter (ADC) 9 intended to convert the analogue data from sensors 4, additional means 8 and means 5 for determining reference directions to the digital ones, having, for example, 8-byte value. Output of ADC 9 is connected to input of stacker means 10 having number of memory cells not less than (n+m+k). Stacker means 10 via polling means 11 are coupled to long-term memory 12 and data preparation means 13. Long-term memory means 12 is intended to store data on the user's position and orientation that vary with time depending on his/her movements for subsequent use for various purposes. Further, output of long-term memory means 12 can be connected to input of data preparation means 13 intended for smoothing obtained data, excluding random errors and representing them in the form that is acceptable for constructing a mathematical model of a user. In one embodiment output of the long-term memory means can be connected to output of ADC according to a particular design of ADC. For consideration of both above versions, elements 7, 9, 10, 11 can be generalised as analogue-to-digital conversion means.

Output of data preparation means 13 is connected to three-dimensional space mathematical model construction means 14, wherein a user (or which is represented for a user) and the user's mathematical model in this space are to be displayed. Means 13 and 14 can be defined by a generalised notion as means for processing measured and converted digital data. To means 14 connected are means for inputting additional data 15, using which means an additional information about a user to be displayed in space, temporal relationships between movements of a user and dynamics of the displayed space changes, is provided. This information can also represent such additional data on a user as height, weight, gender, age, etc. When any additional inflation is absent or not required, then the user's mathematical model is computed for an average individual, who has standard proportions. Means 14 comprise the following units: means 16 for determining orientation of a main segment whereat arranged are means 5 for determining reference directions, in relation to reference directions; means 17 for construction of a user's model as a whole; means 18 for determining a reference segment(s) of a user; means 19 for positioning a user relative to a reference in a simulated space computed by a computer. To output of means 14 connected is input of means 20 for forming an image at a required viewing angle. Output of means 20 is connected to input of means 21 for displaying the simulated user's position and orientation as positioned relative to a reference in a space to be displayed.

Figure 3:
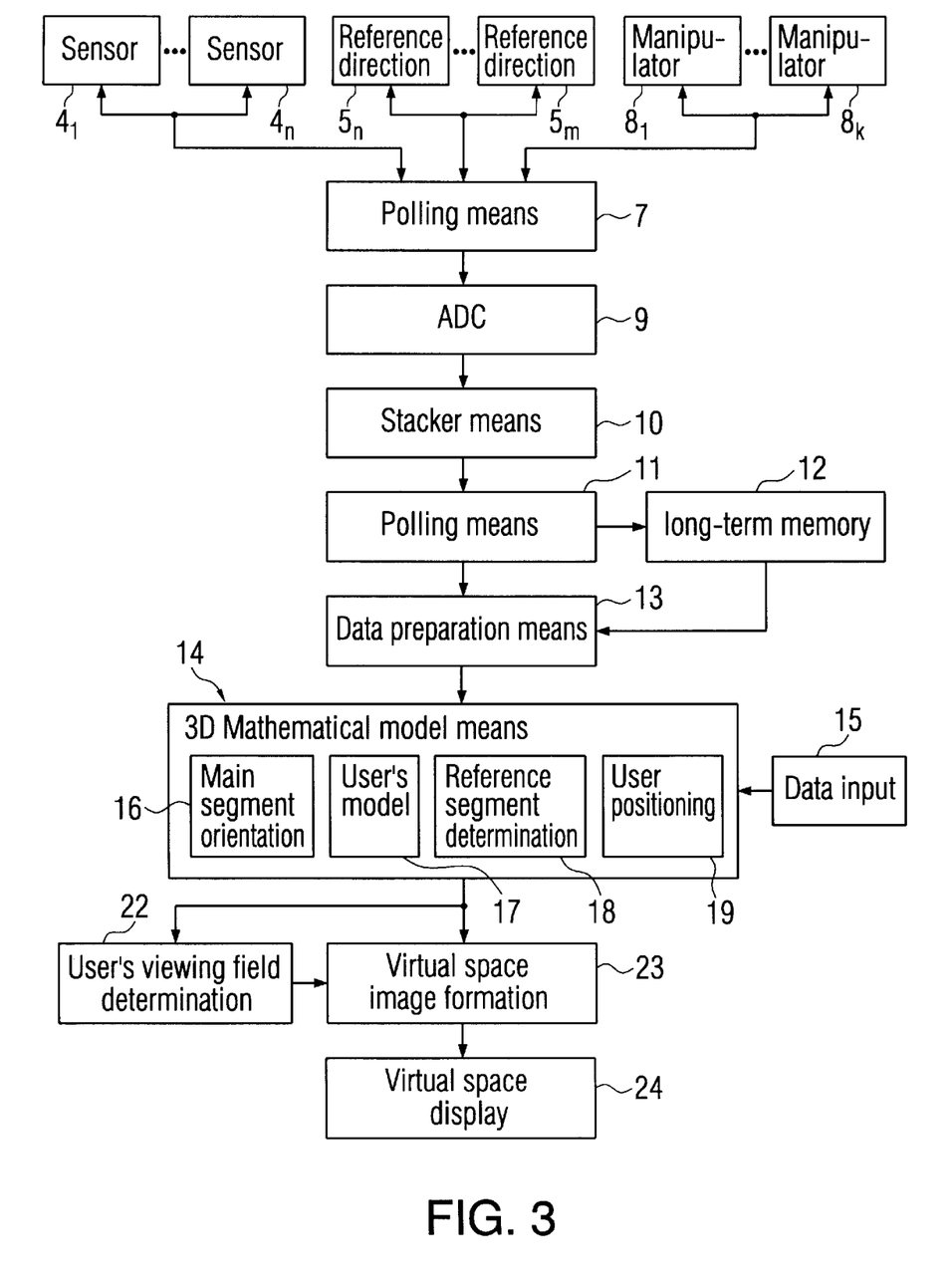
FIG. 3—generalised flowchart of the system for representation of the virtual space for a user who moves in the real space, according to the invention.

Shown in FIG. 3 system of representation of the virtual space for a user, who moves in the real space comprises elements 4, 5, 7–19 which are similar to those of FIG. 2, and differs from the system of FIG. 2 in that to output of means 14 connected are input of means 22 for determining the user's viewing field and input of means 23 for formation of the virtual space image signals that correspond to the user's viewing field. Output of means 22 is also connected to input of means 23 for formation of the virtual space image signals. To output of means 23 connected is input of means 24 for displaying for a user the virtual space wherein he/she is immersed, in accordance with his/her position and orientation in this space.

The system for tracking and displaying the user's position and orientation shown in FIG. 2 operates as follows.

Sensors 4 and means 5 for determining reference directions in the preferable embodiment are attached to special outfit of the overalls type, or immediately on a user at places of articulations 3 of segments 2 and at segments 2 proper. An outfit having a system of sensors 4 and means 5 must have a little weight, can be easily put on and off, and not hinder the user's movements. Sensors 4 on such outfit are attached such that when a user is in motion, i.e. when angles between segments 2 vary or when one end of a segment rotates in relation to the other end along the segment axis, certain physical parameters in the sensors would change. These physical parameters are to vary within certain limits according to changes of angles between adjacent segments 2 from one extreme position to the other.

The system can include main and additional means 5 for determining reference directions and providing determination of an angle between the segment whereat appropriate means 5 are angled and the reference directions. Main means 5 for determining reference directions are arranged at a segment to be considered as the main segment. The main segment will be expediently selected such that it would be closer to the geometric centre of a user and most stable during typical movements of a person: running and walking. The pelvic segment satisfies these requirements the best. When a user is immersed in the virtual reality, for the purpose of a faster and more accurate tracking of inclinations and turnings of the head, additional means 5 for determining reference directions and disposed on head can be used.

Data from sensors 4, means for determining reference directions 5 and additional means 8 for interaction with the virtual space objects are read at ADC 9 and updated in accordance with the polling signal formed by a driving generator of polling means 7. Data from ADC 9 are sent to respective memory cells of stacker means 10.

Polling means 11 accomplish polling of memory cells of stacker means 10 and form a series of data characterising the user's position and orientation inclusive of the data from additional means 8 associated with a particular (current) instant of time, and transfer these data to long-term memory means 12 for long-term storage. These data can be used any time, and for that purpose they will be supplied to data preparation means 13 for further processing. When used in the real time mode, the data from polling means 11 are directly applied to data preparation means 13. Means 13 smooth the received data, exclude random errors and represent them to means 14 in the required form for constructing the user's mathematical model.

In means 14 the three-dimensional space mathematical model where a user is to be displayed and a mathematical model of a user in this space are constructed. Using means 15 for inputting additional data into means 14, additional information on a user, a space to be displayed, temporal relationships between the user's movements and dynamics of changes of the space to be displayed are inputted. This information can be such additional data on a user as height, weight, gender, age, etc. If such additional information is absent or not required, then a mathematical model is computed for an average person having standard proportions. When the "Hulliver" effect is to be created, when objects of a space to be displayed are unnaturally enormous or tiny, then the inputted data on proportions between linear dimensions of the space and the objects therein and linear dimensions of a user are altered. In the same way, an accelerated or slowed-down course of time in a space to be displayed can be inputted, by altering the user's movements dynamics when data are inputted from long-term memory means 12. When the user's movements data are supplied to means 13 in the real time modality, processes passage dynamics in a space to be displayed can be accelerated or slowed down.

Means 16 for position and orientation of a main segment compute and construct, according to the received data, the main segment position and orientation, at which segment the main means for determining reference directions relative to reference directions are arranged. The directions associated with the magnetotelluric field, "North-South" and "West-East" directions, or a local vertical determined on the basis of the Earth's gravitational field, and the "North-South" direction will be expediently used as the reference directions. These fields are actually ubiquitous and do not depend on a user. Using a special device like an electromagnetic compass, compass, or a horizontal or vertical gravitational sensor, the user's orientation and, in particular, that of the segment of the user's locomotor system whereat this device is attached can be determined. At the places where a strong noise exists, or Earth's magnetic field is shielded, an artificial field of reference directions can be created. Then it will be important only to determine the user's orientation in this field, and it will not be required to determine the absolute distance to these means using triangulation algorithms that need intensive computations.

In means 17 for construction of the user's model as a whole, adjacent segments are fitted to the constructed main segment according to changed data on the angles between such adjacent segments; then to the constructed adjacent segments next adjacent segments will be fitted, and so on up to the final segments.

In means 18 the user's reference segment, or reference segments are determined. For example, if a user moves on a horizontal planar surface, the segment which is the lowest relative to the local vertical will be considered as the reference segment, and the lowest portion of this segment—as the reference "point".

In means 19 a user is positioned relative to the reference in the space computed by a computer. For this purpose, in the most simple case, the oriented user's model and the user's reference in the space to be simulated are coincided such that the reference portion of the user's reference segment and the part of the space to be simulated being the user's reference at that moment would coincide. In the case a user is in a motion, for example when he/she leaps, i.e. there is some time in "flight", a user is positioned in relation to the reference using the immediately preceding data on the motion dynamics. It should be borne in mind that if a complete information about dynamic changes of angles between segments is available, even the user's momentum and the force with which he/she pulls off from the reference can be calculated. This will allow to simulate such user's movements in the displayed space that will be actually identical to the real ones. Further, in accordance with a dynamically changing position and orientation of segments of a user, the changing user's position (coordinates) and orientation as a whole in the space is tracked. That is to say that according to the user's movements displayed image it will be seen, for example, that a user took ten steps in the Northern direction, turned around and ran to the "South-East", and so on.

Data on the constructed user's model in the simulated space are transmitted from output of means 14 to input of means 20 for formation of an image at the required viewing angle where the observer's viewing point is selected, the user's image at the required viewing angle is calculated and, when necessary, the image is amended for its subsequent display. From output of means 20 the data are transferred to input of means 21 which displays the simulated user's position and orientation, which user has been positioned relative to the reference, in the space to be displayed. In means 20 a user him/herself and other observers may, if they wish so, predetermine an aspect to view the user's movements dynamics. It is also possible, if necessary, to view the user's movements from above or below, from a side or a at variable viewing point. When movements of a user(s) previously stored in a long-term memory device are displayed, they can be amended prior to displaying in conformity with a task at hand. For example, movements of one user stored in a memory device in various times can be displayed simultaneously, or movements of different users can be displayed simultaneously for comparison. User's movements, as required by a particular purpose, can be displayed in the form of simplified stylised pattern, or any in other form that would be mare approximated to the real images with "rendering" of complex textures of clothes, skin, environmental space. In the first case, any computer could handle such task, in the latter case a sufficiently powerful computer having good graphics capabilities is to be applied.

Operation of the system of the invention for representation of the virtual space for a user in the main corresponds to the foregoing description referring to FIG. 2. The difference is that means 14 construct a model of the three-dimensional space to be displayed for a user, and the user's mathematical model in this space. Data of the user's constructed model in the simulated space from means 14 are transferred to input of means 22 for determining the user's viewing field and input of means 23 for formation of a virtual space image. In means 22 the user's viewing field in the virtual space is determined according the data that were supplied from means 14, i.e. it is determined which portion of the virtual space a user might view at a given moment. From output of means 22 the user's viewing angle data are sent to means 23 for formation of image of the virtual space. In means 23, according to the user's viewing field and a virtual space model, formed is an image of such portion of the virtual space that can be seen by a user in accordance with his/her position and orientation in the virtual space calculated in conformity with movements in the real space. From output of means 23 signals are applied to input of means 24 to display for a user the virtual space, wherein he/she is immersed, according to his/her position and orientation in this space. Any device for displaying the virtual space can be used as means 24: monitor, virtual helmet or goggles, including means 6 (FIG. 1).

As mentioned heretofore in characterisation of the prior art, in most known systems formation of a user's model is accomplished according to the absolute co-ordinates determined by sensors disposed on a user. In such systems the user's position in space as a whole is determined automatically. In the motion, the absolute co-ordinates will provide a route of a user's movements. The space is limited mostly by the scope of capabilities of external sensors or emitters arranged around the user's actions active area. As distinct from such systems, in this invention the user's movement active area practically is not limited, for everything that is needed to determine the user's position and orientation is disposed on a user him/herself. In such arrangement important is only the presence of a field for operation of reference directions determination means, and user's spatial movement is calculated by a computer according to the data on the changes of value of angles between segments and the orientation relative to reference directions. A changes in space can be calculated on the basis of number, length and direction of user's steps. To determine length of a step, angles between the user's reference segments at the moment a step is taken and linear dimensions of segments must be known. Particularly, to determine length of a step taken by a person, the following must be known: angle between thigh bones of right and left legs, angle between thigh bone and shank for each leg and linear dimensions of shank and thigh. In some cases it may be also expedient to measure angles between foot and shank, also between foot and toes.

To simplify the criterion of determination of the reference segments using orientation of segments relative to a plane, sensors disposed on user's soles can be used. For instance, if a leg at a moment is a supportive one, then an appropriate contact is closed in a sensor, and, vice versa, when a leg is lifted and poised, this contact opens. A sensor can also provide data on a load level exerted on each of legs. Using a value of load value exerted on a leg in the motion and the user's weight, the user's motion route can be calculated even for a leap. The necessary data for calculation of a motion route, the user's movements physical characteristics can also be calculated using the dynamics of changes of the angles between segments.

INDUSTRIAL APPLICABILITY

A method and a system of the invention provide a number of completely novel opportunities which have not been realised heretofore, in particular, the opportunities to carry out testing and contests involving any kind of movements: those of sports, dances, for the purpose to evaluate the right response to a proposed situation, in "duels". Such contests will be possibly held on the basis of the time-division principle, by reading the data, for example, from the same user in various times. Then these data could be evaluated, compared both using a computer and a referee after these movements have been visualised for their comparison. It will be possible to stage contests among a plurality of users simultaneously. For this purpose, in the real time modality, data from a number of users are read and compared for the performance correctness, right response to a situation, the response speed, movements ingenuity. Such contests can be held amongst users of the claimed system who are connected to Internet or any other specialised network, such that users being able to be situated at considerable distance from one another.

The user's position and orientation data stored in a memory, can be additionally comprised by associated archives. It will be possible to establish libraries of data on the typical human movements, any chordal animals and unique movements recorded from prominent athletes, dancer.

One of the important advantages of the invention is caused by the fact that the whole system of sensors is disposed on a user. There is no necessity to determine absolute distances to the reference points that have to be determined in the known systems by the external sensors arrangement positions. The invention provides the possibility to determine the user's position and orientation in a practically unlimited space wherever exists a field of the reference directions, in relation of which a user can be oriented. As described above, determination of the reference directions involves determination of orientation of a segment whereat means for determining the reference directions are disposed, relative to the reference directions. The Earth's natural fields vectors which are present practically independently everywhere will be advantageously used as the reference directions. It is suggested that "North-South" and "East-West" directions of the magnetotelluric field, or, for example, the "North-South" direction and a local vertical determined by the Earth's gravitational field will be used as two reference directions (the third is to be established orthogonally to these two). In the event a user is in any premises that are shielded from the external fields, emitters of the reference directions artificial fields can be installed. In such case, as before, the user's orientation in the reference directions field, not absolute distances to the external emitters, will have to be determined. For this purpose, determined are angles between a vector of a segment, whereat means for determining reference directions are disposed, and the reference directions.

By tracking the user's position and orientation and displaying the virtual space for a user according to the invention, it will be possible to realise, during immersion in the vertical reality, almost all attributes of the "time machine" within the scope of protocolled history of the user's actions. A user may at any moment of his/her protocolled actions, or actions of any other personage, return to any time section within the scope of his/her history. It may be useful in computer games so that a player could return and change his/her behaviour to attain a better performance. Owing to the possibility to record several parallel behavioural patterns, a user is able to choose any, more successful in his opinion, pattern to resume his/her actions. When the user's position and orientation in-motion changes protocols are used, the four-dimensional space determined by three spatial dimensions and the time can be realised. As distinguished from movements in real life where a motion in time is carried out only in the single direction—towards future, in this invention it is possible, by use of recorded data, to implement the function of continuous or discrete temporal motion in various directions as easily and freely as in space, within the scope of the previously recorded data.

The invention that provides the possibility to track the user's movements and represent for him/her the virtual space without use of any sophisticated external devices, will result in enhancing the capabilities of the existing computer systems and creating novel areas of application. A standard for description of the user's tracked movements for use in various systems can be established in future. Such user's movements description standard might become a part of virtual reality modelling language (VMRL), be used in the animation and for establishing specialised libraries. Majority of the computer usages in future will use these standards; the possibility to control a programme using the user's natural movements to be tracked by this invention method being provided for. For the purpose that the entire pool of the contemporary computer usages, where the user's movements are realised by keyboard, "mouse", or joystick, might be applied using this invention system, the connecting drivers have to be compiled, i.e. the programmes that identify the user's movements and convert them into signals to control games and simulate such movements.

An important application of the invention relates to teaching a user the paragon movements, for instance those of dances and sports, for health-toning, learning of professional movements. For this purpose, the paragon movements will be displayed for a user. To attain a better performance, the possibility of iterations, selection of any viewing aspect, performance tempo and scale is to be provided for for a trainee. In such case a user has to try to mimic the movements as exactly as possible; further, his/her movements, for the subsequent monitoring, must be recorded, protocolled, whereafter they will be compared with paragons. Comparison between the paragon movements and those of a user may be done by various methods, also visually by a user him/herself, with, now simultaneous, display of the paragon movements and the previously recorded user's movements. Assessment of correctness of the user's movements by a computer or an expert can become a more interesting and promising kind of application. A computer according to an inputted programme by comparing the user's movements tracked through user's position and orientation will be capable to state comments and advice. A user will make amendments in his/her movements so that to attain required skill and authentic precision. Such process is similar to a training guided by a trainer-master, but does not require the associated expenditures and matching of its time-schedule with that of trainer. Such feedback programme as compiled by the best expert trainers could be reproduced by millions of copies, and everyone will be able to use it at a convenient time.

This invention can also be used for regulation of "batched" physical loads exercises to be tried by a user. For example, a load is predetermined for a particular individual pursuant to advice furnished by a physician or a trainer. If there are no such specific advice or any general contraindications, a computer itself would be able to compute and recommend a loads pattern for a certain period of time. The data on any previous or chronic illnesses, weight, height, gender, age, purpose of training, level of daily physical or emotional loads can be used to determine the required loads. Specialised preliminary tests can be applied through monitoring the body responses; for example, changes of the pulse under batched loads.

After a required load is specified, a computer can provide optimum recommendations for a certain period. A user commences exercises using a system of sensors that to the most complete degree would track the user's movements and the data on the loads exerted on different body parts that are easily calculated on the basis of the movements data. In such exercises the use of the data from the user's pulse, and, if necessary, other physiological indices will be useful.

If a user is immersed in the virtual reality and uses a simulator that allows to perform unrestricted movements, then the applied physical and emotional loads could be adjusted via a relevant entered programme, changing thereby the scenario, dynamics and conditions of the user's environment. In play, such monitoring can be accomplished by "batching" the number of the popping-up enemies, scenario intensity, the necessity to chase an adversary at a sufficient speed, or escape the dangerous places. Through such adjustment, that is to be carried out in an unnoticeable, for a user, manner, the pulse, for example, could be maintained at a specified beat rate during a predetermined period. When a predetermined load is achieved, a user is to be brought to fulfilling an involved task and completing a scenario. This will permit a user to end a training session with a sense of an achievement in an emotionally elated mood. Unfortunately, the games played nowadays do not satisfy these principles. A player is mostly static, i.e. any physical load, while experiencing a high emotional one, is absent, which can lead to stresses and depressions. Plays and trainings to be executed in the context of regulated physical and emotional loads can become good means to manage hypodynamia or nervous overloads, be instrumental to comprehensive harmonious development of a person.

Trainings under predetermined physical loads accompanied by informative or entertainment data can be carried out by immersion in a certain, to be selected by a user, virtual environment. For example, a computer programme can simulate a jogging-sightseeing through famous places together with a guide who would talk about notable sights and set the outing speed by strides or cantering at a certain or variable, as necessary fastness. Such sightseeing could be brought to its end when a certain predetermined load is achieved. Because such trainings are individual ones, a computer memory might store data of the past trainings and loads for the following changes of the loads beginning from initial loads up to stable recommended ones. The everyday normal fixed or variable loads can be given an emotional tinting and accompanied by new and useful information. For the purpose of better emotional tinting, a user can be provided an opportunity to select the guide's gender and his/her age, or simulate such guide as having the looks of a popular actor or politician.

If a user, using a sensors system gets a load without immersion in the virtual reality, the loads monitoring can be carried out by a processor, and the feedback—via headphones, through the ear tract. A processor can advise a user about the necessity to alter the loads overall rate, or loads upon particular body parts. Such inferences will be done on the basis of the data coming from the system for tracking ad orientation of a user in accordance with the loads calculation programme.

We claim:

1. A system for representation of virtual space for a user who moves in the real space, comprising a plurality of relative rotation angles sensors arranged adjacently to main articulations between the user's locomotor system segments, or at segments proper, for outputting, at outputs of said sensors, signals of relative rotation angles of said segments;

means for determination of reference directions, which means are arranged at least at one of the user's locomotor system segments, for outputting a reference direction signal at output of said reference directions determination means;

signals analogue-to-digital conversion means, having a first input for receiving signals of said plurality of relative rotation angles sensors, a second input for receiving signals of said at least one means for determination of reference directions, and an output for outputting digital data;

means for processing digital data for construction of a mathematical model of the three-dimensional space and a user in this space, having a first input for receiving said digital data, and a second input for inputting additional data on a user and a space to be displayed, and an output for outputting data on a constructed mathematical model of a user in a space to be simulated;

means for determination of the user's viewing field, having an input connected to output of said digital data processing means, and an output;

means for forming signals of image of virtual space corresponding to the user's viewing field, having a first input connected to output of said digital data processing means, a second input connected to output of means for determination of the user's viewing field, and an output;

means for displaying virtual space for a user, having an input connected to output of means for forming signals of a virtual space image that corresponds to the user's viewing field.

2. A system as claimed in claim 1, wherein a strain gauge is used as a relative rotation angle sensor.

3. A system as claimed in claim 1, wherein a fibre-optics sensor is used as a relative rotation angle sensor.

4. A system as claimed in claim 1, wherein means for determination of reference directions comprise a magnetotelluric field sensor and a local vertical sensor.

5. A system as claimed in claim 4, wherein a gravitation sensor is used as a local vertical sensor.

6. A system as claimed in claim 1, wherein a gyrostabilised sensor of reference directions is used as means for determination of reference directions.

7. A system as claimed in claim 1, wherein means for determination of reference directions comprise a sensor of reference directions external source signal.

8. A system as claimed in claim 1, further comprising a manipulator for interaction of a user with objects of displayed real or virtual space, an additional reference directions determination means arranged on a manipulator, having an output connected to input of analogue-to-digital conversion means.

9. A system as claimed in claim 1, further comprising long-term memory means, having an input for receiving digital data from said output of the analogue-to-digital conversion means.

10. A method for representation of virtual space for a user taking into account his/her motion in the real space, including the following steps:

a) attaching, at each of the main articulations of the user's locomotor system segments, means for determination of at least one angle between segments that are adjacent to a respective articulation;

b) determination of linear dimensions of the user's locomotor system segments;

c) arranging, at least at one of the user's locomotor systems segments, means for determining reference directions;

d) determination of orientation of at least one segment, whereat the reference directions determination means are arranged, relative to said reference directions;

e) determination of angles between segments that are adjacent to said main articulations;

f) determination of orientation and position of a user in space as a whole on the basis of obtained values of angles and orientation of said at least one segment, whereat the reference directions determination means are arranged;

g) determination of a reference segment or reference segments of the user's locomotor system segments;

h) positioning of said reference segment or segments relative to a reference in the virtual space to be displayed;

i) determination of position and orientation of user's head in virtual space for determining the user's viewing field in the virtual space;

j) formation and representation for a user of an area of the virtual space corresponding to his/her viewing field.

11. A method as claimed in claim 10, including iteration of steps from (g) to (j) for displaying changes of the virtual space in real time according to user's movements and interaction with virtual space objects.

12. A method as claimed in claim 10, further comprising a step of registration of a series of data on the user's position and orientation for subsequent use.

13. A method as claimed in claim 10, wherein "North-South" directions of a magnetotelluric field sensor and a local vertical sensor direction are used as reference directions.

14. A method as claimed in claim 10, wherein "North-South" and "West-East" directions of a magnetotelluric field sensor are used as reference directions.

15. A method as claimed in claim 10, wherein directions established by gyrostabilised sensors of reference directions are used as reference directions.

16. A method as claimed in claim 10, wherein directions established by an artificial external source of reference directions are used as reference directions.

17. A method as claimed in claim 10, wherein at least one pair of spatially separated sensors of absolute co-ordinates, which pair is arranged at least at one of the user's locomotor system segments, is used as means for determining reference directions.

18. A method as claimed in claim 10, including determination of linear dimensions of the user's locomotor system segments on the basis of known human body proportions, using the user's height data.

19. A method as claimed in claim 10, further including scaling of values of linear dimensions of the user's locomotor system segments for corresponding change of his/her dimensions relative to a space to be displayed.

20. A method as claimed in claim 10, further including steps of use of a manipulator for interaction of a user with objects of virtual space to be displayed, determination of position of a manipulator by a position of user's hand holding the same, and determination of exact orientation of a manipulator using, arranged thereon, additional means for determination of said reference directions.

21. A method as claimed in claim 10, wherein the following joints are selected as main articulations between the user's locomotor system segments: hip joint, knee joints, mortis joints, glenohumeral joints, elbow joints, hand joints, articulation of head and shoulders and articulation of thoracic and waist portions of spine.

22. A method as claimed in claim 21, wherein joints of foot and fingers are additionally selected the main articulations.

23. A system of tracking and displaying the user's spatial position and orientation, comprising a plurality of relative rotation angles sensors arranged adjacently to main articulations between the user's locomotor system segments, or at said segments proper for outputting signals of relative rotation angles of said segments at said sensors outputs;

means for determination of reference directions, arranged at least at one of the user's locomotor system segments, for outputting a reference direction signal at output of said means for determination of reference directions;

means for analogue-to-digital conversion of signals, having a first input for receiving signals of said plurality of relative rotation angles sensors, a second input for receiving signals of said at least one means for determining reference directions, and an output for outputting digital data;

means for processing digital data for constructing a mathematical model of the three-dimensional space and a user in this space, having an input for receiving said digital data, and an output for outputting data on the user's position and orientation in the three-dimensional space to be simulated, and means for displaying the user's spatial position and orientation, having an input for receiving data on the user's position and orientation in the three-dimensional space to be simulated.

24. A system as claimed in claim 23, further comprising at least one means of interaction of a user with virtual space objects, whereon arranged are additional means for determination of reference directions connected to a respective input of the analogue-to-digital conversion means.

25. A system as claimed in claim 23, wherein a relative rotation angles sensor is implemented as a strain gauge.

26. A system as claimed in claim 23, wherein a relative rotation angles sensor is implemented in the form of a fibre-optics sensor.

27. A system as claimed in claim 23, wherein the reference directions determination means comprises a magnetotelluric field sensor.

28. A system as claimed in claim 27, wherein the reference directions determination means further comprise a local vertical sensor.

29. A system as claimed in claim 28, wherein a gravitation sensor is used as a local vertical sensor.

30. A system as claimed in claim 23, wherein the reference directions determination means comprise a sensor of signal of an artificial external source of reference directions.

31. A system as claimed in claim 23, further comprising means for storing converted measured data for further reproduction of the user's spatial position and orientation, connected to a digital data processing means via a transfer bus.

32. A system as claimed in claim 23, further comprising means for inputting additional data on a user and the three-dimensional space to be displayed, connected to a respective input of the digital data processing means.

33. A system as claimed in claim 23, further comprising means for forming an image at a specified viewing angle and amending an image, having an input connected to output of the digital data processing means, and an output connected to input of means for displaying the user's spatial position and orientation.

34. A method of tracking and displaying a position and orientation of a user in space, comprising the steps of:

a) attaching means for determining at least one angle between segments adjacent to a respective articulation at each one of main articulations of segments of the user's locomotor system;

b) disposing, at least at one of the user's locomotor system segments, means for determining reference directions;

c) determining orientation of at least one segment, at which segment the reference direction determination means are disposed, relative to said reference directions;

d) determining angles between segments which are adjacent to said main articulations;

e) determining the user's position and orientation as a whole in space on the basis of obtained values of angles, and orientation of said at least one segment, at which segment the reference directions determination means are disposed.

35. A method as claimed in claim 34, comprising iteration of steps from (c) to (e) at a specified periodicity to obtain interrelated series of data that determine temporal changes in the user's spatial position and orientation according to real movements of a user.

36. A method as claimed in claim 35, comprising registration of obtained data on the user's spatial position and orientation for further use.

37. A method as claimed in claim 34, wherein at step (e) values of linear dimensions of the user's locomotor system segments are used, said method further comprising the following steps:

f) determination of a reference segment or segments of the user's locomotor system;

g) positioning of said reference segment or segments relative to a reference in a space to be displayed.

38. A method as claimed in claim 37, comprising iteration of steps (c) to (g) at a specified periodicity to obtain and register series of data on the user's position and orientation in a space to be displayed, and display the user's movements in accordance with the obtained data.

39. A method as claimed in claim 38, comprising display of the user's movements in real time.

40. A method as claimed in claim 39, comprising display of the user's movements in accordance with a required viewing aspect.

41. A method as claimed in claim 39, further comprising steps of amending an obtained image of the user's movements, and displaying the amended image of movements.

42. A method as claimed in claim 38, comprising display of the user's movements in accordance with the registered data as necessary at a subsequent instant of time.

43. A method as claimed in claim 37, comprising determination of linear dimensions of the user's locomotor system segments on the basis of known human body proportions using data on a user's height.

44. A method as claimed in claim 37, further comprising scaling of linear dimensions values of the user's locomotor system segments for respective change of his/her dimensions relative to a space to be displayed.

45. A method as claimed in claim 37, further comprising steps of using a manipulator for interaction of a user with objects of virtual space to be displayed, determining a position of a manipulator according to a position of a user's hand holding the same, and determining an exact orientation of a manipulator using additional, disposed thereon, means for determination of said reference directions.

46. A method as claimed in claim 13, wherein "North-South" directions of magnetotelluric field sensor and directions of a local vertical are used as reference directions.

47. A method as claimed in claim 34, wherein "North-South" and "West-East" directions of a magnetotelluric field sensor are used as reference directions.

48. A method as claimed in claim 34, wherein directions established by gyrostabilised sensors of reference directions are used as reference directions.

49. A method as claimed in claim 34, wherein directions established by an external source of reference directions are used as reference directions.

50. A method as claimed in claim 34, wherein at least one pair of spatially separated sensors of absolute co-ordinates disposed at least at one of the user's locomotor system segments is used as means for determining reference directions.

51. A method as claimed in claim 34, wherein thigh joint, knee joint, mortis joints, glenohumeral joints, elbow joints, hand joints, head and shoulders articulation and articulation of the thoracic and waist portions of spine are selected as main articulations between segments of the user's locomotor system.

52. A method as claimed in claim 51, wherein joints of foot and fingers are further selected as main articulations.

* * * * *

UNITED STATES PATENT AND TRADEMARK OFFICE
CERTIFICATE OF CORRECTION

PATENT NO.    :  6,005,548

DATED         :  December 21, 1999

INVENTORS     :  Latypov et al.

It is certified that error appears in the above-identified patent and that said Letters Patent is hereby corrected as shown below:

On the title page, please insert the reference to the foreign application priority date as follows:

--[30] Foreign Application Priority Data
Aug. 14, 1996   [RU]   Russian Federation ........................ 96116414
Aug. 14, 1996   [RU]   Russian Federation ........................ 96116415--.

In column 18, line 45 (claim 42, line 1):  renumber claim "42." as --40.--.

In column 18, line 38 (claim 40, line 1):  renumber claim "40." as claim --41.--; and change "claim 39" to --claims 39 or 40--.

In column 18, line 41 (claim 41, line 1):  renumber claim "41." as claim --42.--; and change "claim 39" to --claims 39 or 40--.

In column 18, line 65 (claim 46, line 1):  change "claim 13" to --claim 1--.

Signed and Sealed this

Fifteenth Day of August, 2000

Attest:

Q. TODD DICKINSON

Attesting Officer          Director of Patents and Trademarks